United States Patent
Goyal et al.

(10) Patent No.: US 8,135,434 B2
(45) Date of Patent: Mar. 13, 2012

(54) INTEGRATING DEVICE FUNCTIONALITY INTO A TELECOMMUNICATIONS SERVICE COMPOSITION

(75) Inventors: Sunil Goyal, Haryana (IN); Sumit Mittal, Uttar Pradesh (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/414,972

(22) Filed: Mar. 31, 2009

(65) Prior Publication Data

US 2010/0248696 A1  Sep. 30, 2010

(51) Int. Cl.
    H04M 1/00  (2006.01)
(52) U.S. Cl. ................... 455/550.1; 709/203
(58) Field of Classification Search .......... 455/550, 455/418, 419; 709/203, 224, 209, 246, 245, 709/219, 223, 227, 238, 321; 710/9
See application file for complete search history.

(56) References Cited

U.S. PATENT DOCUMENTS

| | | | |
|---|---|---|---|
| 6,618,764 B1 | 9/2003 | Shteyn | |
| 6,687,356 B1 | 2/2004 | Glitho et al. | |
| 7,088,995 B2 | 8/2006 | Rao | |
| 7,240,068 B2 | 7/2007 | Hsu et al. | |
| 7,975,232 B2 * | 7/2011 | Bohle | 715/762 |
| 2008/0077713 A1 * | 3/2008 | Kim et al. | 710/9 |

OTHER PUBLICATIONS

Android Operating System: http://en.wikipedia.org/wiki/Google_Android.
Websphere Everyplace Mobile Portal (WEMP): http://www-01.ibm.com/software/pervasive/ws_everyplace_mobile_portal_enable/.
Mittal et al., SewNet—A Framework for Creating Services Utilizing Telecom Functionality. WWW 2008, Apr. 21-25, 2008, Beijing, China.
Nokia Web Toolkit: http://www.forum.nokia.com/Resources_and_Information/Tools/All_Tools_and_SDKs.xhtml.

* cited by examiner

Primary Examiner — Joseph Lauture
(74) Attorney, Agent, or Firm — Ryan, Mason & Lewis, LLP

(57) ABSTRACT

Techniques for integrating device functionality into a composition of telecommunication service are provided. The techniques include using a service specification to generate a composition, wherein the composition comprises one or more telecommunication network blocks, one or more non-telecommunication blocks, and one or more place holders for device functionality, and integrating device functionality into the composition based on a target device.

20 Claims, 5 Drawing Sheets

INTEGRATING DEVICE FUNCTIONALITY INTO A TELECOMMUNICATIONS SERVICE COMPOSITION

FIELD OF THE INVENTION

Embodiments of the invention generally relate to information technology, and, more particularly, to telecom services.

BACKGROUND OF THE INVENTION

Increasing functionality and decreasing cost has lead to mobile phones becoming a worthy alternative to personal computers (PCs) for accessing information and services. The mobile phone information service platform has experienced tremendous growth, and with deep penetration of mobile devices, service providers have started to focus their attention on creating services for mobile devices. Such services often use telecom network features, mobile device features, and other hosted services and application logic.

There exists a wide range of mobile phones with varying capabilities. As such, the existing approaches disadvantageously present the need to provide different implementations of the same application for different devices.

SUMMARY OF THE INVENTION

Principles and embodiments of the invention provide techniques for integrating device functionality into a telecommunication (telecom) service composition. An exemplary method (which may be computer-implemented) for integrating device functionality into a composition of telecommunication service, according to one aspect of the invention, can include steps of using a service specification to generate a composition, wherein the composition comprises one or more telecommunication network blocks, one or more non-telecommunication blocks, and one or more place holders for device functionality, and integrating device functionality into the composition based on a target device.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
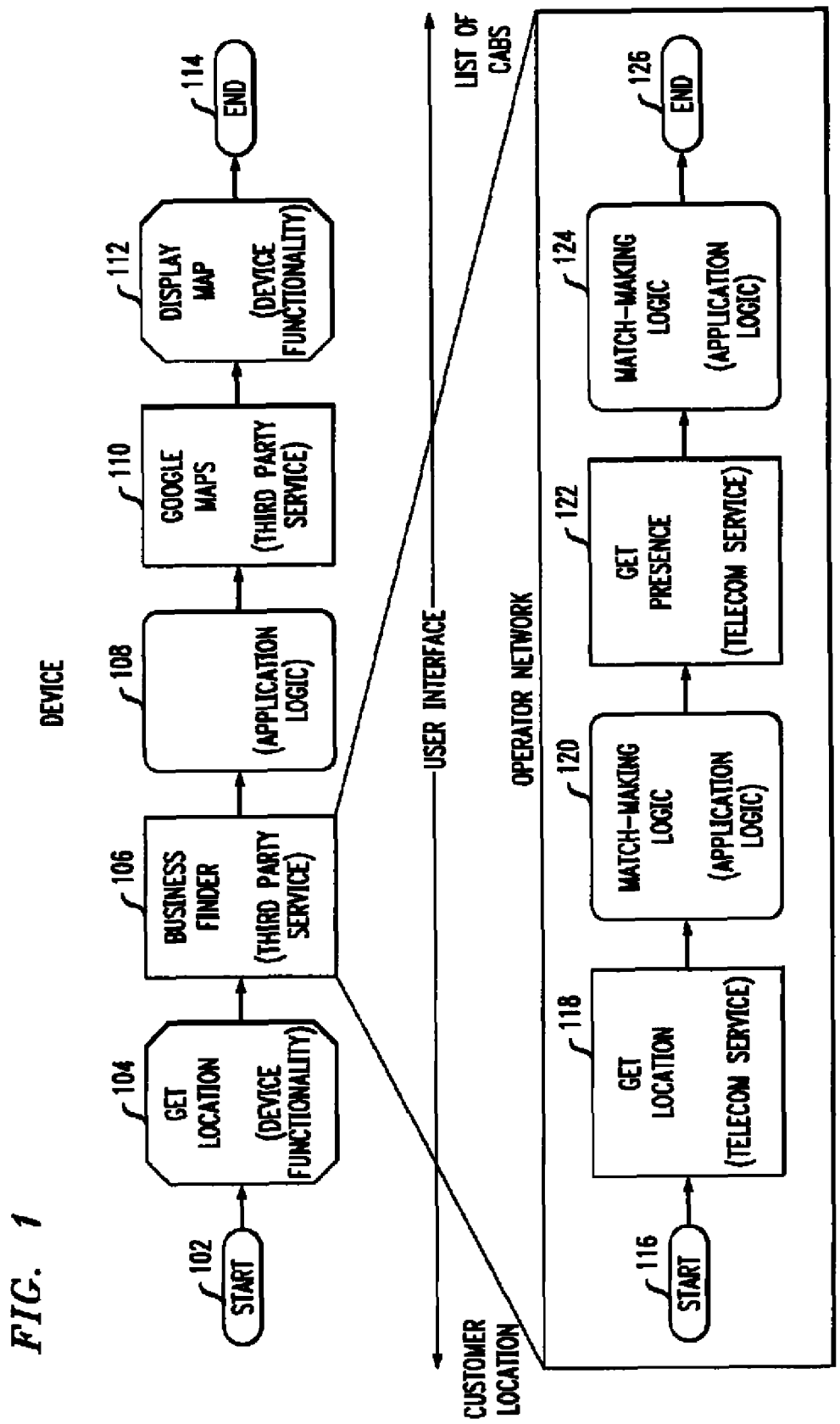
FIG. 1 is a diagram illustrating an exemplary setting, according to an embodiment of the present invention.

Principles of the invention include integrating device functionality in telecom service composition. As noted herein, there are a wide range of mobile phones available in the market today, with varying capabilities, including display and other features. One or more embodiments of the invention include simplifying the enablement of a next-generation telecom application for different device types, as well as doing away with the need to provide different implementations of the same application for different devices.

The techniques described herein can include the use of a composite telecom service having a 3-dimensional (3-D) workflow such as, for example, the following. One or more embodiments of the invention include telecom network blocks that can include information such as, for example, presence and capability such as, for example, messaging, third party call control, etc. Telecom network blocks can be offered, by way of example, through a telecom operator network.

Also, one or more embodiments of the invention include device blocks that can include an access point (letting the user access the service) and display point (for the returned response), as well as a store house of information such as, for example, calendar, user profile, location (for example, cell site information), etc. Additionally, non-telecom blocks can include hosted services such as, for example, third-party services hosted on the web (for example, Google Maps), as well as offerings on the telecom provider's infrastructure (for example, ring-tones).

One or more embodiments of the invention also include application logic such as, by way of example, gluing various components together and determining the flow of the service, as well as application specific code, application logic, etc. Further, a user interface (UI) can include a rich downloaded application using phone UI as well as browser driven UI.

Also, as described herein, telecom operators have core functionalities such as, by way of example, short message service (SMS), call control, location, presence, etc. that can be characterized by carrier-grade quality of service (QoS) and high availability. With underlying telephony and internet protocol (IP) networks converging, such functionalities can be used with other offerings on the Web. To enable an open garden model of service creation, operators need to expose core telecom functionalities for use in different applications.

As detailed herein, one or more embodiments of the invention include integrating device functionality and/or features into compositions of telecom services. The techniques described herein enable two-staged code generation from service specification. The static composition includes telecom network blocks, non-telecom blocks, and place holders for device functionality. Device functionality and corresponding functionality implementation may be picked up dynamically depending on the device type at the time of service delivery (late binding) or at the time of application download (dynamic binding). Also, one or more embodiments of the invention include encapsulating device functionality using a proxy-model, wrapping the underlying implementation and platform details, and integrating the structured model into existing development environments.

Additionally, in contrast to disadvantageous existing approaches, one or more embodiments of the invention include creating a telecom application incorporating device capability into telecom applications that execute on the device platform itself, as well as enabling the inclusion of device capability into composite telecom applications through the notion of a proxy model. Further, unlike existing approaches, the techniques described herein include providing a methodology for efficiently developing applications for different device platforms.

In developing telecom applications, one can divide telecom service composition into two stages, static composition and device composition, to allow for dynamic binding. Static composition includes, for example, using telecom network blocks and non-telecom blocks, as well as providing placeholders for device functionality. Device composition includes, depending on the device, picking up correct functionality at the time of service delivery (late binding) or at the time of application download (dynamic binding).

To realize dynamic binding with respect to a device, one or more embodiments encapsulate device functionality using a proxy model and wrap the underlying implementation and platform details. A structured model can be integrated into existing development environments as can richness, in order to provide social networking and collaboration (Web 2.0). One or more embodiments of the invention can also include proxy codes for an exhaustive set of device connect points. By way of example, such proxy codes can include proxies for accessing mobile device capability (for example, Java specification request (JSR) 248), proxies for providing high-level application programming interfaces (APIs) abstracting device functionalities such as, for example, location, calendar, display settings, etc. Further, these proxies can be clustered based on device groupings across different platforms.

The techniques described herein include separating application workflow on telecom devices and core telecom network. Additionally, one or more embodiments of the invention include generating telecom device-specific work flows from a generic application technique by using late binding based on abstraction of device functionalities. A toolkit, such as detailed herein, can be used, for example, by telecom service providers, their partners as well as their customers to deploy innovative services based on different mobile platforms. Also, such a toolkit can enable support for a broad range of devices available in the market.

FIG. 1 is a diagram illustrating an exemplary setting, according to an embodiment of the present invention. By way of illustration, FIG. 1 depicts a flow of data on a device, a user interface (UI) and a flow of data on an operator network. The data flow on a device can include a progression from a start 102, a device functionality (for example, Get Location) 104, third party services (for example, a business/enterprise finder) 106, application logic 108, third party services (for example, Google Maps) 110, device functionality (for example, display map) 112 and an end 114.

The data flow on an operator network (for example, included in a third party service) can include a progression from a start 116, a telecom service (for example, Get Location) 118, application logic (for example, match-making logic) 120, a telecom service (for example, Get Presence) 122, application logic (for example, match-making logic) 124 and an end 126.

As described herein and depicted in FIG. 1, one or more embodiments of the invention enable a unified and integrated view for application developers. By way of example, the techniques detailed herein include providing a model for including device characteristics into service creation, and connecting existing development environments to include device aspects.

Figure 2:
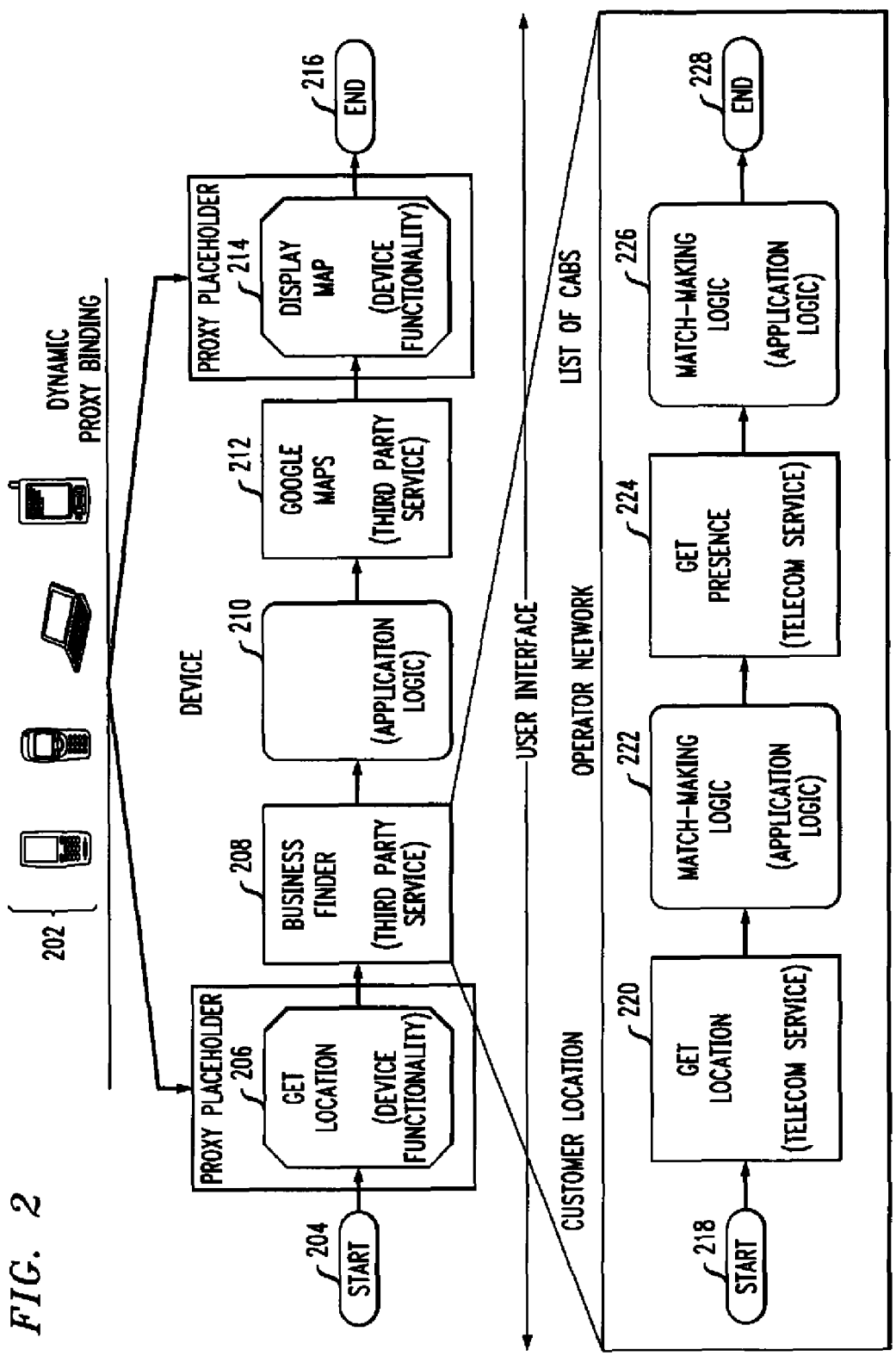
FIG. 2 is a diagram illustrating an exemplary setting, according to an embodiment of the present invention.

FIG. 2 is a diagram illustrating an exemplary setting, according to an embodiment of the present invention. By way of illustration, FIG. 2 depicts one or more devices 202, a flow of data on a device, a user interface (UI) and a flow of data on an operator network. The data flow on a device can include a progression from a start 204, a device functionality (for example, Get Location) 206 that serves as a proxy placeholder (for dynamic (or late) proxy binding), third party services (for example, a business/enterprise finder) 208, application logic 210, third party services (for example, Google Maps) 212, device functionality (for example, display map) 214 that can act as a proxy placeholder for implementing dynamic (or late) proxy binding and an end 216.

The data flow on an operator network (for example, included in a third party service) can include a progression from a start 218, a telecom service (for example, Get Location) 220, application logic (for example, match-making logic) 222, a telecom service (for example, Get Presence) 224, application logic (for example, match-making logic) 226 and an end 228.

Figure 3:
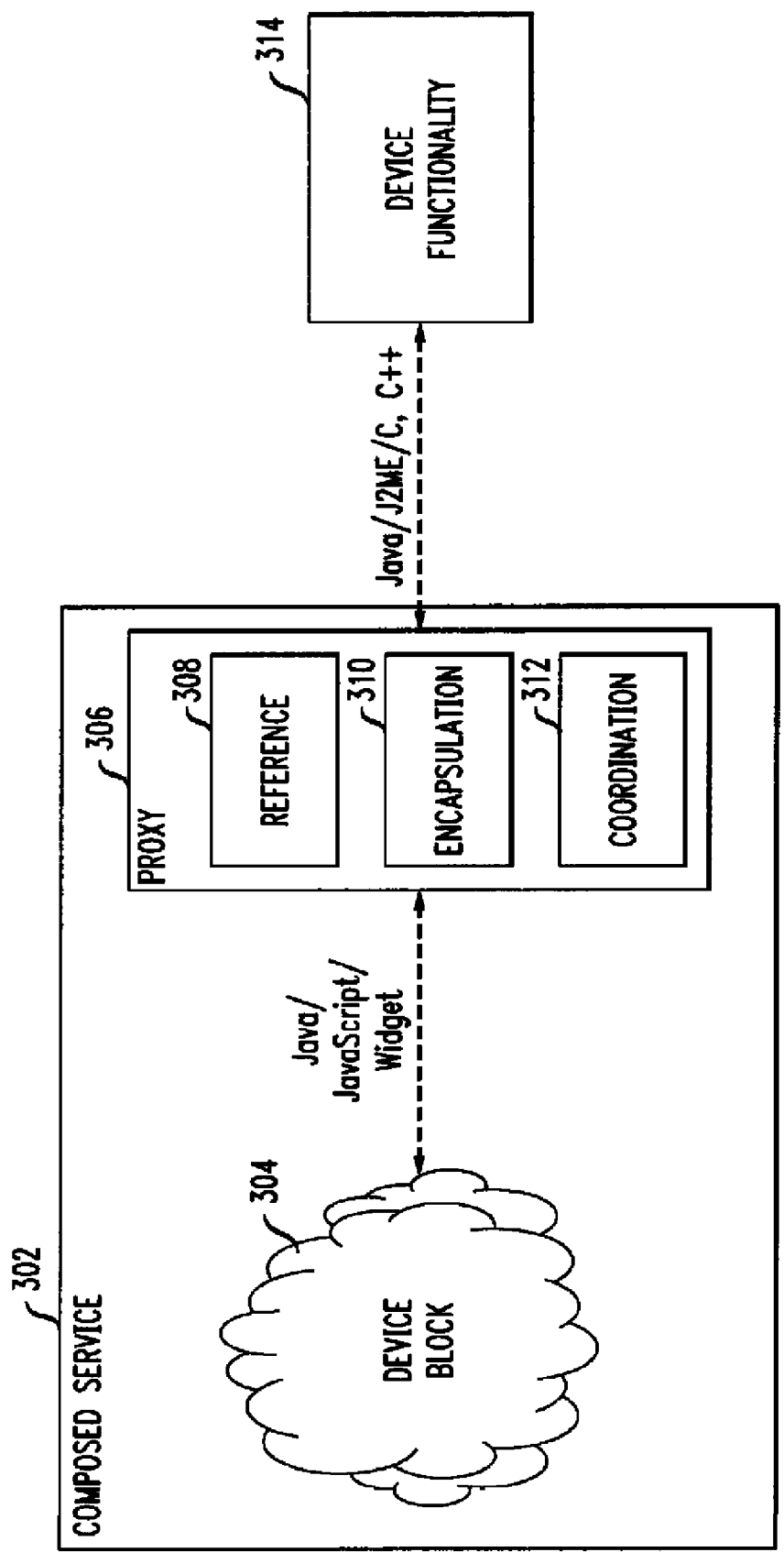
FIG. 3 is a diagram illustrating a device proxy model, according to an embodiment of the present invention.

FIG. 3 is a diagram illustrating a device proxy model, according to an embodiment of the present invention. By way of illustration, FIG. 3 depicts a composed service 302, which includes a device block 304 that interacts (for example, via Java, JavaScript and/or a widget) with the proxy component 306. Component 306 includes a reference component 308, an encapsulation component 310 and a coordination component 312. Component 306 also interacts (for example, via Java, J2ME, C and/or C++) with a device functionality component 314.

As described herein, one or more embodiments of the invention can include proxy structure that includes proxy representation (for example, name, method signatures, description, metadata, etc.) and proxy implementation (for example, associated jars, other resources, etc.). Additionally, the techniques detailed herein include clustering proxies according to grouping of devices and also alternative mechanisms if a particular feature is not available in a device.

Also, utility snippets described herein can be configurable (for example, expiry time for cached location information, time to ring, etc.), and can include value-adds (for example, setting of ring-tone based on caller), code fragments, samples, application templates, etc. One or more embodiments of the invention can also include coordination constructs (for example, access control, display settings, etc.) that can include inputs from both the developer and the device bearer. Additionally, one or more embodiments of the invention include Web 2.0 features (for example, social networking, links to blogs, etc.) as well as unit test code.

As described herein, service creation can proceed in stages, such as those detailed below. A service design stage can include a developer specifying steps in his or her composite scenario, including network blocks, device blocks and application logic blocks. A proxy lookup stage can include returning a set of matching proxies for each device block. This lookup can be a selection from an existing list or can be a search based on keywords or input-output, or both. In the latter case, a proxy selection stage can include selecting a proxy, from candidate proxies for each step that best suits criteria.

A static code generation stage can include network code (for example, which can remain same across different devices) that runs on the network (for example, an enterprise archive (EAR) file deployed on IBM Websphere Application Server (WAS)). Additionally, one or more embodiments of the invention include incorporating appropriate application logic and creating place holders for device proxies. Device proxies can include dynamic device binding, which includes device code (for example, Android proxies for a Google handset). Device proxies can also include device proxy configuration by the service user, which can include accepting and/or configuring various policies (for example, those relating to access of address book).

Figure 4:
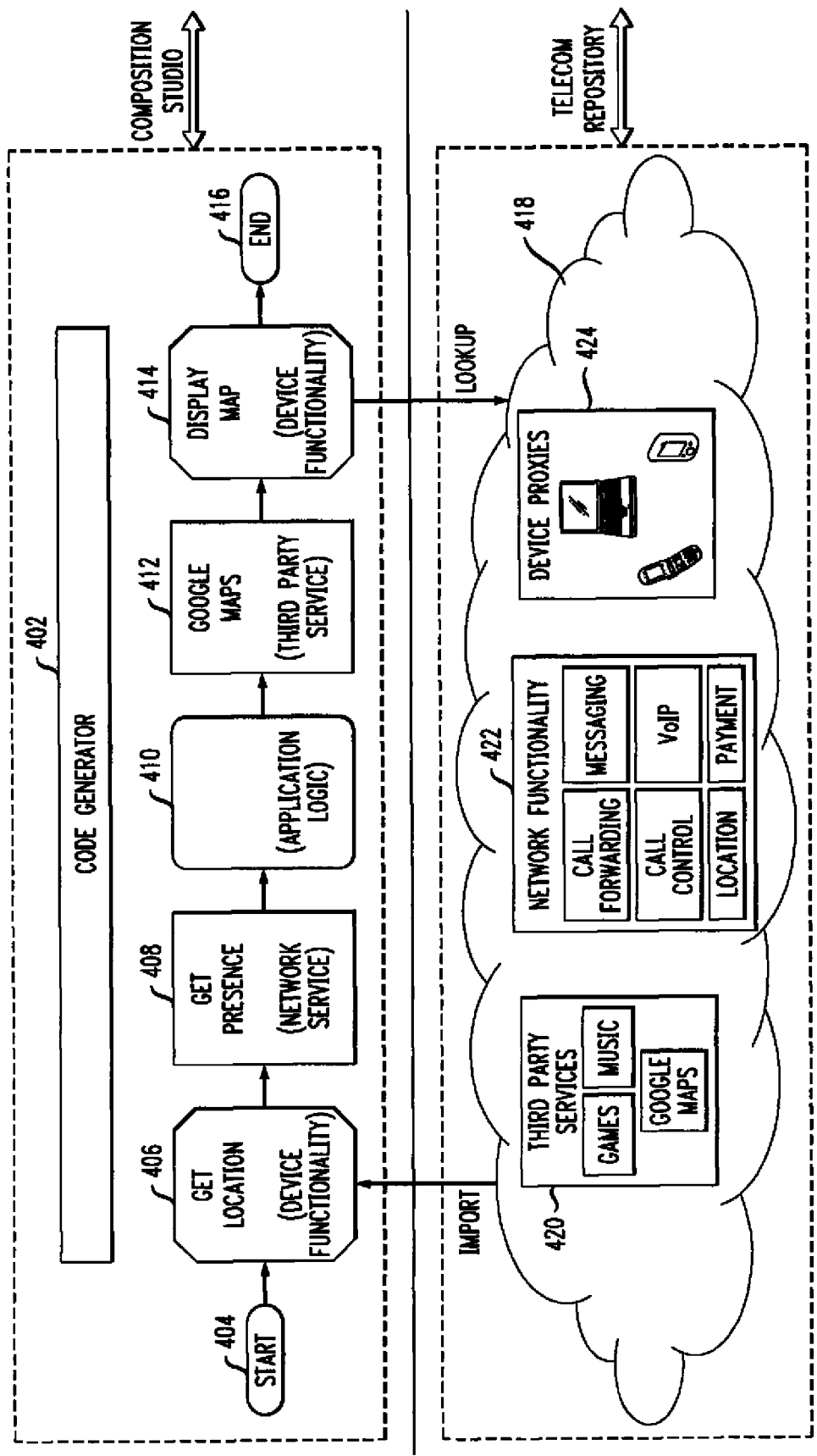
FIG. 4 is a diagram illustrating an integrated view of service composition for telecom, according to an embodiment of the present invention.

FIG. 4 is a diagram illustrating an integrated view of service composition for telecom, according to an embodiment of the present invention. By way of illustration, FIG. 4 depicts a code generator 402 and a data flow that includes a progression from a start 404, a device functionality (for example, Get Location) 406, a network service (for example, Get Presence) 408, application logic 410, third party services (for example, Google Maps) 412, device functionality (for example, display map) 414 and an end 416.

FIG. 4 also depicts a network 418 that includes third party services (for example, games, music, Google Maps, etc.) 420, network functionality (for example, call forwarding, messaging, call control, voice over internet protocol (VoIP), location, payment, etc.) 422 and device proxies 424.

Figure 5:
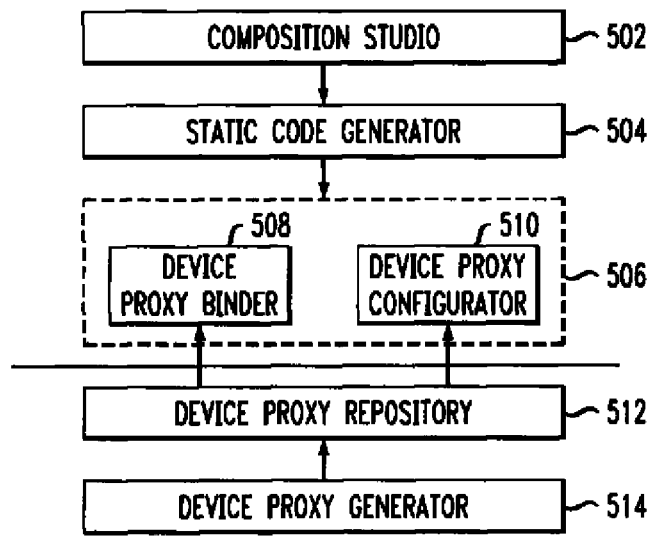
FIG. 5 is a block diagram of a non-limiting exemplary embodiment, according to an aspect of the invention.

FIG. 5 is a block diagram of a non-limiting exemplary embodiment, according to an aspect of the invention. FIG. 5 includes the following components and/or modules. A composition studio module 502 enables a developer to design an application including, for example, telecommunication network blocks, non-telecommunication blocks and one or more device blocks. The composition studio module 502 provides input to a static code generator module 504, which takes an application design and realizes the telecommunication network blocks, non-telecommunication blocks and creates placeholders for device functionality.

The static code generator module 504 provides input to component 506, which includes a device proxy binder module 508, which integrates device functionality into the application by binding placeholders for device functionality to various device proxies, as well as a device proxy configurator module 510, which enables a developer to configure a device proxy. Also, a device proxy repository module 512 includes proxies for various device functionalities across different mobile platforms. Additionally, a device proxy generator module 514 performs the task of wrapping device functionality into the proxy model.

The device proxy generator module 514 provides input to the device proxy repository module 512, which provides input to the device proxy binder module 508 as well as the device proxy configurator module 510.

Figure 6:
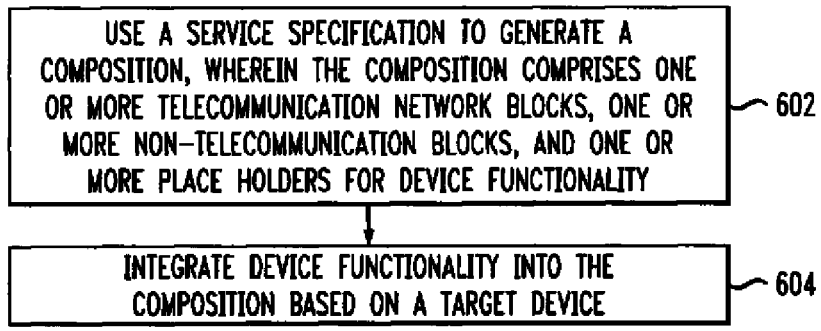
FIG. 6 is a flow diagram illustrating techniques for integrating device functionality into a composition of telecommunication service, according to an embodiment of the invention.

FIG. 6 is a flow diagram illustrating techniques for integrating device functionality into a composition of telecommunication service, according to an embodiment of the present invention. Step 602 includes using a service specification to generate a composition (for example, a static composition), wherein the composition includes one or more telecommunication network blocks, one or more non-telecommunication blocks (for example, application logic, user interface (UI), etc.), and one or more place holders for device functionality. This step can be carried out, for example, using a composition studio module.

Step 604 includes integrating device functionality into the composition based on a target device. This step can be carried out, for example, using a device proxy binder module. Integrating device functionality into the composition can include the device proxy binder module, executing on the hardware processor, dynamically integrating device functionality into the composition based on device. Additionally, integrating device functionality into the composition can include the device proxy binder module, executing on the hardware processor, integrating device functionality into the composition at a time of service delivery and/or a time of application download.

The techniques depicted in FIG. 6 can also include, as described herein, providing a system, wherein the system includes distinct software modules, each of the distinct software modules being embodied on a tangible computer-readable recordable storage medium. The techniques depicted in FIG. 6 can include, for example, taking a service composition and realizing one or more telecommunication blocks and one or more non-telecommunication blocks, and creating one or more placeholders for device functionality. This step can be carried out, for example, using a static code generator module. Also, one or more embodiments of the invention include encapsulating device functionality (for example, hiding device complexity and heterogeneity and wrapping an underlying implementation and one or more platform details using a proxy-model. These steps can be carried out, for example, using a device proxy generator module.

Additionally, one or more embodiments of the invention can include integrating a structured model into existing one or more development environments (for example, proxies for different devices, device groupings and platforms, and alternative mechanisms if particular feature not available in a device). This step can be carried out, for example, using structure of the proxy module. The techniques depicted in FIG. 6 can also include designing a service specification, wherein designing a service specification includes separating one or more network, device and non-telecommunication blocks. This step can be carried out, for example, using a composition studio module.

Further, one or more embodiments of the invention include presenting a view to an application developer, wherein the view can be used to configure one or more properties and one or more attributes attached to a proxy. This step can be carried out, for example, using an integrated composition studio module and/or a device proxy configurator module. Also, the techniques depicted in FIG. 6 can include connecting one or more development environments to include one or more device aspects. This step can be carried out, for example, using a device proxy repository module. The device aspects can include, for example, one or more proxies.

Additionally, one or more embodiments of the invention can include exposing device functionality. This step can be carried out, for example, using a device proxy model module, which hides device heterogeneity by exposing a consistent interface across one or more device platforms, and enables integration into one or more existing application development environments. Also, a device proxy model module facilitates clustering based on one or more groupings of one or more device platforms and allows an instance to be configured by an application developer before being integrated into the application. Configuring a proxy for fine-tuning various properties and attributes can be performed using a proxy configurator module, wherein a proxy binder module helps bind a device proxy to a proxy placeholder.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
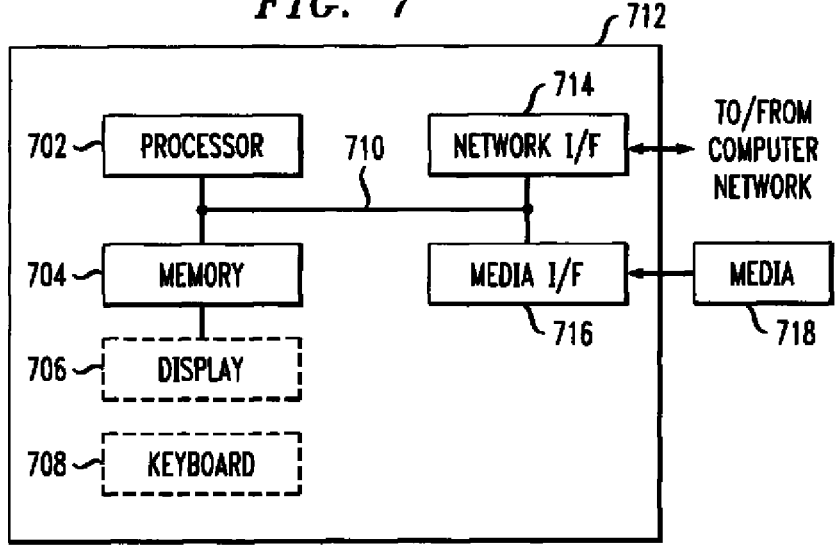
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 704), magnetic tape, a removable computer diskette (for example media 718), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 5. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating a telecom application incorporating device capability into telecom applications that execute on the device platform itself.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for integrating device functionality into a composition of telecommunication service, comprising the steps of:

using a service specification to generate a composition, wherein the composition comprises one or more telecommunication network blocks, one or more non-telecommunication blocks, and one or more place holders for device functionality;

integrating device functionality into the composition based on a target device; and exposing device functionality, carried out by a device proxy model module executing on a hardware processor, wherein the device proxy model module:

hides device heterogeneity by exposing a consistent interface across one or more device platforms; and enables integration into one or more existing application development environments.

2. The method of claim 1, wherein the device proxy model module further:

facilitates clustering based on one or more groupings of one or more device platforms; and allows an instance to be configured by an application developer before being integrated into the application.

3. The method of claim 1, further comprising:

providing a system, wherein the system comprises distinct software modules, each of the distinct software modules being embodied on a tangible computer-readable recordable storage medium, and wherein the distinct software modules comprise a composition studio module, and a device proxy binder module;

wherein:

using a service specification to generate a composition is carried out by the composition studio module executing on the hardware processor; and integrating device functionality into the composition is carried out by the device proxy binder module executing on the hardware processor.

4. The method of claim 3, wherein:

the distinct software modules comprise a composition studio module, and wherein:

designing a service specification is carried out by the s composition studio module executing on a hardware processor, and wherein designing a service specification comprises separating one or more network, device and non-telecommunication blocks.

5. The method of claim 3, wherein:

integrating device functionality into the composition comprises the device proxy binder module, executing on the hardware processor, dynamically integrating device functionality into the composition based on device.

6. The method of claim 3, wherein:

integrating device functionality into the composition comprises the device proxy binder module, executing on the hardware processor, integrating device functionality into the composition at least one of a time of service delivery and a time of application download.

7. The method of claim 3, wherein:

the distinct software modules further comprise a static code generator module and a device proxy generator module, and wherein:

taking a service composition and realizing one or more telecommunication network blocks and one or more non-telecommunication blocks, and creating one or more placeholders for device functionality is carried out by the static code generator module executing on a hardware processor; and encapsulating device functionality and wrapping an underlying implementation and one or more platform details using a proxy-model is carried out by the device proxy generator module executing on a hardware processor.

8. The method of claim 3, wherein:
the distinct software modules further comprise a device proxy configurator module, and wherein:
presenting a view to an application developer, wherein the view is used to configure one or more properties and one or more attributes attached to a proxy is carried out by the device proxy configurator module executing on a hardware processor.

9. The method of claim 3, wherein:
the distinct software modules further comprise a device proxy repository module, and wherein:
connecting one or more development environments to include one or more device aspects is carried out by the device proxy repository module executing on a hardware processor.

10. The method of claim 9, wherein the one or more device aspects comprise one or more proxies.

11. A computer program product comprising a tangible computer readable recordable storage medium including computer useable program code for integrating device functionality into a composition of telecommunication service which, when implemented, cause a computer to carry out a plurality of method steps comprising:
using a service specification to generate a composition, wherein the composition comprises one or more telecommunication network blocks, one or more non-telecommunication blocks, and one or more place holders for device functionality;
integrating device functionality into the composition based on a target device; and
exposing device functionality, carried out by a device proxy model module executing on a hardware processor, wherein the device proxy model module:
hides device heterogeneity by exposing a consistent interface across one or more device platforms; and
enables integration into one or more existing application development environments.

12. The computer program product of claim 11, wherein the device proxy model module further:
facilitates clustering based on one or more groupings of one or more device platforms; and
allows an instance to be configured by an application developer before being integrated into the application.

13. The computer program product of claim 11, wherein the computer usable program code for integrating device functionality into a composition of telecommunication service comprises distinct software modules, the distinct software modules comprising a composition studio module, and a device proxy binder module;
wherein:
the composition studio module comprises the computer usable program code for using a service specification to generate a composition; and
the device proxy binder module comprises the computer usable program code for integrating device functionality into the composition.

14. The computer program product of claim 13, wherein the computer usable program code for integrating device functionality into a composition of telecommunication service comprises distinct software modules, the distinct software modules comprising a device proxy binder module;
wherein:
the device proxy binder module comprises the computer usable program code for integrating device functionality into the composition at least one of a time of service delivery and a time of application download.

15. The computer program product of claim 13, wherein the computer usable program code for integrating device functionality into a composition of telecommunication service comprises distinct software modules, the distinct software modules comprising a static code generator module, and a device proxy generator module;
wherein:
the static code generator module comprises the computer usable program code for taking a service composition and realizing one or more telecommunication network blocks and one or more non-telecommunication blocks, and creating one or more placeholders for device functionality; and
the device proxy generator module comprises the computer usable program code for encapsulating device functionality and wrapping an underlying implementation and one or more platform details using a proxy-model.

16. A system for integrating device functionality into a composition of telecommunication service, comprising:
a memory; and
at least one processor coupled to the memory and operative to:
use a service specification to generate a composition, wherein the composition comprises one or more telecommunication network blocks, one or more non-telecommunication blocks, and one or more place holders for device functionality;
integrate device functionality into the composition based on a target device; and
expose device functionality, carried out by a device proxy model module executing on a hardware processor, wherein the device proxy model module:
hides device heterogeneity by exposing a consistent interface across one or more device platforms; and
enables integration into one or more existing application development environments.

17. The system of claim 16, wherein the device proxy model module further:
facilitates clustering based on one or more groupings of one or more device platforms; and
allows an instance to be configured by an application developer before being integrated into the application.

18. The system of claim 16, further comprising a tangible computer-readable recordable storage medium having distinct software modules embodied thereon, the distinct software modules comprising a composition studio module, and a device proxy binder module;
wherein:
the step of using a service specification to generate a composition is carried out by the composition studio module executing on the hardware processor; and
the step of integrating device functionality into the composition is carried out by the device proxy binder module executing on the hardware processor.

19. The system of claim 18, further comprising a tangible computer-readable recordable storage medium having distinct software modules embodied thereon, the distinct software modules comprising a device proxy binder module;
wherein:

integrating device functionality into the composition at least one of a time of service delivery and a time of application download is carried out by the device proxy binder module executing on the at least one processor.

20. The system of claim 18, further comprising a tangible computer-readable recordable storage medium having distinct software modules embodied thereon, the distinct software modules comprising a static code generator module, and a device proxy generator module;

wherein:

taking a service composition and realizing one or more telecommunication network blocks and one or more non-telecommunication blocks, and creating one or more placeholders for device functionality is carried out by the static code generator module executing on the at least one processor; and encapsulating device functionality and wrapping an underlying implementation and one or more platform details using a proxy-model is carried out by the static code generator module executing on the at least one processor.

* * * * *